United States Patent Office 3,438,916
Patented Apr. 15, 1969

3,438,916
USE OF CHLORINATED MELAMINES IN CURING OF POLYURETHANES
Arnold Rogers Davis, Berkeley Heights, N.J., assignor to American Cyanamid Company, Stamford, Conn., a corporation of Maine
No Drawing. Continuation-in-part of abandoned application Ser. No. 324,842, Nov. 19, 1963. This application May 25, 1967, Ser. No. 641,111
Int. Cl. C08g 22/04, 51/84
U.S. Cl. 260—18                                       3 Claims

ABSTRACT OF THE DISCLOSURE

A process of heat curing sulfur-curable polyurethanes with sulfur and a vulcanization accelerator, effecting said curing in the presence of: (A) about 0.1 to 1.2 weight percent of an N-chloromelamine having 3 to 6 chlorine atoms, preferably hexachloromelamine; (B) about 0.1 to 2.5 weight percent of a zinc salt of a fatty acid having 12 to 18 carbon atoms; (C) about 0.1 to 2.5 weight percent of a fatty acid having 12 to 18 carbon atoms, said percentages being based on the amount of polyurethane.

USE OF CHLORINATED MELAMINES IN CURING OF POLYURETHANES

This application is a continuation-in-part of application Ser. No. 324,842, filed Nov. 19, 1963, now abandoned.

This invention relates to the curing of polyurethanes. More particularly, it is concerned with an improved system for vulcanizing sulfur-curable polyester and/or polyether based polyurethanes.

Polyurethanes containing non-benzenoid —CH═CH— groups have many rubber-like properties, combining many of the advantages of natural rubber with those of the polyurethanes. The uncured polymers have good bin stability. They may be compounded and vulcanized with sulfur in the presence of an accelerator. Cured products have many desirable properties which include abrasion resistance, thermal stability at high temperatures, good low temperature properties and excellent resistance to sunlight, oxygen, ozone, oil and other hydrocarbons. Vulcanized polyurethanes may be employed in the manufacture of a wide variety of articles including tires, tubing, wire coatings, thread, footwear and mechanical goods.

Such polyurethanes have been successfully vulcanized by heating with sulfur and conventional accelerators, i.e., accelerators used for curing natural and man-made rubbers. Unfortunately, the curing cycle requires a long time, more than is economically or commercially practicable. This is particularly true for those polyurethanes in which the —CH═CH— curing sites are in side chains attached to the main polymer chain.

Sulfur has long been known as a vulcanizing agent for unsaturated rubbers, but it is well known that the rate of vulcanization is extremely slow. Thus, a rubber-and-sulfur compound in thin slate form requires 3 to 4 hours of heating at 286° F. to reach an acceptable state of cure. For this reason, so-called accelerators are used to permit practical vulcanization rates. Typical accelerators are thiazoles, such as 2-mercaptobenzothiazole and benzothiazyl disulfide. While this type of accelerator is practical for the highly unsaturated rubbers such as natural rubber and styrene-butadiene rubber, it is found that additional activation is required to attain practical vulcanization rates with synthetic rubbers of low unsaturation, particularly the unsaturated polyurethane elastomers. In such cases, the use of certain "activators," in addition to the customary accelerators, has been proposed to shorten the curing cycle and provide a commercially practical curing process. Suggested activators include, for example, the zinc halides. Unfortunately, zinc halides are extremely hygroscopic and very irritating when in contact with the skin. Zinc halide co-ordination complexes of 2-mercaptobenzothiazole (MBT) and 2,2'-dithiobisbenzothiazole (MBTS) have been used to overcome these objections, as in U.S. Patent No. 2,846,416. Other suggested activators are cadmium stearate and zinc halide-cadmium chloride complexes of MBT and MBTS as in U.S. Patent No. 2,870,157.

Unfortunately, again, the use of such activators has not proved completely satisfactory in curing polyurethanes. Their use does not provide the desired curing rate. Due to the necessarily high concentrations of accelerator, objectionable blooming and yellowing of the cured elastomer results. Accordingly, there remains a definite need for an activator which does not exhibit these undesirable features but will produce the desired polyurethane curing rate. It is, therefore, the principal object of this invention to provide such an improved activator system for vulcanizing unsaturated polyurethanes.

In accordance with the present invention, this object is fulfilled to a surprisingly successful degree, as a result of the discovery that certain N-chlorinated melamines in combination with a long chain fatty acid and a zinc salt of such an acid unexpectedly act as excellent activators for known accelerators in vulcanizing sulfur-vulcanizable polyurethanes. They produce curing at the desired rates. Cured products are free of objectionable bloom and discoloration.

This result is quite surprising since materials previously used as activators in rubber vulcanizing are not satisfactory here. In U.S. Patent No. 3,070,571, chlorinated melamine has been used to shorten the required mastication time in compounding black rubber mixes of high carbon black content. However, they have not shown any particularly useful properties as activators in such previous usage. Successful use in this case, therefore, is completely unexpected. Many sulfur-vulcanizable polyurethanes are available. For example, polyester and polyester-amide polyurethanes containing sulfur-vulcanizable olefinic groups are described in U.S. Patent No. 2,424,884. Polyether-urethanes with linear sulfur-vulcanizable olefinic groups are described in U.S. Patent No. 3,015,636. Polyether urethanes with sulfur-vulcanizable olefinic groups in side chains are described in U.S. Patent No. 2,808,391. Any such polyurethanes containing sulfur-vulcanizable olefinic groups can be cured by the sulfur-based curing systems of this invention.

Considerable variation is permissible as to the amount of sulfur used. It will depend on the particular polyurethane and the desired product. In general, it will be in the range between about 0.5 and about 2.0 weight parts per 100 parts of polyurethane. In most cases, it will be found the preferred range is between 0.75 and 1.25 parts per 100 parts of polyurethane.

One or more standard accelerators of the type normally used in the vulcanization of rubber, both natural any synthetic, may be employed. These include, for example, 2-mercaptobenzothiazole (MBT), 2,2'-dithiobisbenzothiazole (MBTS), 2-mercaptothiazoline (2-MT), the zinc salt of mercaptobenzothiazole and zinc dialkyl dithiocarbamates. Combinations of three different accelerators of the thiazole type, or of two of the thiazole type with one of the thiazoline type, are preferred. In general, the total amount of standard accelerators used may range between about 2.5 and about 6.0 weight parts per 100 parts of polyurethane. In most cases, the preferred practice will use between 4.0 and 5.0 parts per hundred.

N-chlorinated melamines used in the activators of this invention should contain at least three atoms of chlorine replacing hydrogen in the —NH₂ radicals of the melamine. The preferred compound is hexachloromelamine, but trichloromelamine, tetrachloromelamine, or pentachloromelamine can be used.

While the mechanism of activation by the chlorinated melamines of this invention is not understood, it is believed that the activation is due to the labile chlorine atoms made available by the compounds. Since hexachloromelamine has the highest concentration of labile chlorine it is the most effective and preferred compound, but trichloromelamine, tetrachloromelamine or pentachloromelamine can be used if a greater quantity of the N-chlorinated melamine is added. Thus, in Component C of Table I on page 9, wherein 0.5 part of a blend of 25% hexachloromelamine and 75% inert diluents are used—0.6 part of a 25% pentachloromelamine blend would be required; 0.75 part of a 25% tetrachloromelamine blend would be required; and 1.0 part of a 25% trichloromelamine blend would be required.

In general, the amount of chlorinated melamine used should be between about 0.10 and about 1.2 weight parts, preferably between 0.25 part and 1.0 part, per 100 parts of polyurethane. The chlorinated melamine may be blended with inert diluents, such as clay, silica, hydrated silica, diatomaceous earth and similar inert materials compatible with polyurethane.

The other components of the activator of this invention are a long chain fatty acid and a long chain fatty acid zinc salt. Each should contain 12–18 carbon atoms. Mixtures of acids may be used. Up to 2.5 parts, and no less than 0.1 part of each, may be present for each 100 weight parts of polyurethane; but it is preferred to operate within the intermediate range of 0.5–1.5 weight parts of component per 100 parts of polyurethane.

In addition to the sulfur, accelerators and chlorinated melamine, other additives and compounding ingredients may be used. These include conventional fillers and pigments, such as carbon black, clay, titanium dioxide, silica and the like.

The polyurethane, sulfur, accelerator, activator and other additives are compounded and milled, using the same conventional equipment and procedures normally employed in the rubber industry. Resultant compounded elastomers are cured with conventional equipment by heating for periods of about five to sixty minutes at temperatures in the range of about 280° to 315° F.

The invention will be more fully discussed in conjunction with the following illustrative examples. Therein, unless otherwise specified, all parts and percentages are by weight.

The polyester urethane used in Examples 1 and 2 was prepared by the following method:

PREPARATION OF POLYESTER URETHANE VULCANIZABLE GUM (1) 1757 grams of a polyester prepared by the condensation of adipic acid with a slight stoichiometric excess of 90 mole percent of ethylene glycol and 10 mole percent of 1,2-propanediol, and having a molecular weight of about 2,000, was heated to 100° C., dehydrated in vacuo, and subsequently cooled to 85° C.

(2) 388 grams of bitolylene diisocyanate, [5,5′(2,2′-ditolyl diisocyanate)] having the formula:

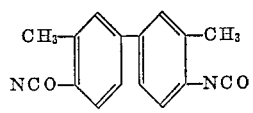

was added and the temperature raised to 100° C. over a period of 15 minutes.

The temperature was maintained at 100° C. for 2.5 hours and for an additional 1.25 hours under vacuum.

The prepolymer thus formed had an NCO content of 2.53%.

(3) The prepolymer was cooled to 85° C. and stirred as 98 grams of glycerol-α-allyl ether containing 0.5 gram of antioxidant [2,2′-methylene bis (4-methyl, 6-tertiary butyl phenol)] was added. The reaction mixture was stirred for 10 minutes at 85° C. and heated to 100° C. over a period of 10 minutes.

(4) The reaction mixture was discharged into suitable containers and cured for 85 hours at 105° C. to a vulcanizable polyurethane gum, which had a Mooney viscosity of 48.

In preparing the elastomeric stock, the following proportions were used in the base formula:

| Component: | Parts |
|---|---|
| Polyester polyurethane | 100 |
| Stearic acid | 0.5 |
| Sulfur | 1.0 |
| Hydrated silica | 10 |
| Titanium dioxide | 10 |

It is referred to below as base "A."

Example 1

Each of three batches of base "A" were compounded with the additives shown below in Table I. Mooney scorch data for the compounded elastomer, the curing conditions and the physical properties of the cured elastomers also are shown in Table I.

TABLE I

| Component | A | B | C |
|---|---|---|---|
| MBTS | 1.5 | 1.5 | 1.5 |
| MBT | 1.0 | | 1.0 |
| Zinc Salt of MBT | 2.5 | 2.5 | 2.5 |
| Zinc Stearate | 1.0 | 1.0 | 1.0 |
| 2-MT | | 1.0 | |
| Hexachloromelamine (25%) ¹ | | | 0.5 |
| Mooney Scorch at 287° F., 5 (min.) | 12.5 | 6.76 | 10 |
| 30-Minute Cure at 287° F.: | | | |
| Modulus, 500% (p.s.i.) | 525 | 725 | 1,000 |
| Tensile Strength (p.s.i.) | 3,525 | 3,750 | 3,800 |
| Elong. (percent) | 900 | 870 | 760 |
| 45-Minute Cure at 287° F.: | | | |
| Modulus, 500% (p.s.i.) | 750 | 975 | 1,125 |
| Tensile Strength (p.s.i.) | 3,375 | 3,675 | 4,000 |
| Elong. (percent) | 800 | 770 | 740 |
| 60-Minute Cure at 287° F.: | | | |
| Modulus, 500% (p.s.i.) | 700 | 875 | 1,025 |
| Tensile Strength (p.s.i.) | 3,300 | 2,925 | 3,575 |
| Elong. (percent) | 830 | 750 | 750 |

¹ Blend of 25% hexachloromelamine and 75% inert diluents.

Comparison of the several batches in the foregoing table will bring out the following facts:

(1) Batch A is representative of the prior practice. Cure is incomplete after 30 minutes, but complete after 45 minutes. The vulcanizate lacks good physical properties.

(2) Batch B has a faster cure than A, but again the ultimate physical properties are impaired.

(3) Batch C, representing this invention, shows a considerably higher rate of cure than any of A and B, and the product possesses good physical properties.

Example 2

Each of three additional batches of base "A" were compounded with the additives shown in Table II. Mooney scorch data of the compounded elastomer, the curing conditions and the physical properties of the cured elastomers also are shown in Table II.

TABLE II

| Component | D | E | F |
|---|---|---|---|
| MBTS | 1.5 | 1.5 | 1.5 |
| MBT | 1.0 | 1.0 | 1.0 |
| Zinc Salt of MBT | 2.5 | 2.5 | 2.5 |
| Zinc Stearate | 1.5 | 1.5 | |
| Zinc Laurate | | | 1.5 |
| Hexachloromelamine (25%) [1] | | 1.0 | 1.0 |
| Mooney Scorch at 287° F., Δ5 (min.) | 12.6 | 10.5 | 10.75 |
| 15-Minute Cure at 287° F.: | | | |
| Modulus, 500% (p.s.i.) | 300 | 400 | 300 |
| Tensile Strength (p.s.i.) | 1,825 | 3,350 | 2,250 |
| Elong. (percent) | 1,200 | 920 | 900 |
| 30-Minute Cure at 287° F.: | | | |
| Modulus, 500% (p.s.i.) | 550 | 1,175 | 1,100 |
| Tensile Strength (p.s.i.) | 3,700 | 4,100 | 3,950 |
| Elong. (percent) | 870 | 730 | 740 |
| 45-Minute Cure at 287° F.: | | | |
| Modulus, 500% (p.s.i.) | 825 | 1,575 | 1,450 |
| Tensile Strength (p.s.i.) | 4,025 | 4,575 | 4,025 |
| Elong. (percent) | 800 | 700 | 600 |

[1] Blend of 25% hexachloromelamine and 75% inert diluents.

(1) Batch D represents prior art, but with an increase in the amount of zinc stearate used. The cure rate was not affected appreciably although the ultimate physical properties were somewhat improved.

(2) Batch E is similar to Batch D except that hexachloromelamine is employed. The product is cured rapidly and has desirable physical properties.

(3) Batch F is similar to Batch E except that zinc laurate is employed in place of zinc stearate. Again the cure is much faster than with Batch D and the physical properties of the elastomer are good.

Example 3

A polyether urethane was prepared according to the procedure of Example 2 in U.S. Patent 2,808,391 as follows:

79.6 parts of 3-(allyloxy)-1,2-propanediol containing 0.5% phenyl-$\beta$-naphthylamine as an antioxidant, was stirred with 313.5 parts of toluene-2,4-diisocyanate at 80° C. for 3.5 hours. Analysis showed an NCO content of 25.35%. 100.4 parts of this reaction mass was then mixed with 306 parts of polytetramethyleneether glycol, having a molecular weight of 1020, and heated for 4 days at 85° C. This polymer had an average molecular weight of 2560 per side chain curing site.

The polyether polyurethane thus obtained contains sulfur-vulcanizable olefinic groups and was compounded according to the following formula:

| Component: | Parts |
|---|---|
| Polyether polyurethane | 100 |
| Titanium dioxide | 10 |
| Stearic acid | 0.5 |
| Sulfur | 1.0 |
| MBTS | 1.5 |
| MBT | 1.0 |
| Zinc salt of MBT | 2.5 |
| Zinc stearate | 1.5 |
| Hexachloromelamine [1] | 1.0 |

[1] Blend of 25% hexachloromelamine and 75% inert diluents.

The elastomer, after curing at 287° F. for 45 minutes, had the following physical properties:

| | |
|---|---|
| Modulus, 500% (p.s.i.) | 1,350 |
| Tensile strength (p.s.i.) | 4,225 |
| Elong. (percent) | 680 |

I claim:

1. In the process of heat curing sulfur-curable polyurethanes with sulfur and a vulcanization accelerator, the improvement which comprises: effecting said heat curing in the presence of the following components:

(A) about 0.1 to 1.2 weight percent of N-chloromelamine having 3–6 chlorine atoms
(B) about 0.1 to 2.5 weight percent of a zinc salt of a fatty acid having 12–18 carbons
(C) about 0.1 to 2.5 weight percent of a fatty acid having 12–18 carbons said percentages being based on the amount of polyurethane.

2. The process of claim 1 wherein component A is hexachloromelamine.

3. The process of claim 1 wherein the accelerator is a mixture of 2-mercaptobenzothiazole, 2,2'-dithiobisbenzothiazole and the zinc salt of 2-mercaptobenzothiazole.

References Cited

UNITED STATES PATENTS

| 2,424,884 | 7/1947 | Cook et al. | 260—75 |
| 2,472,361 | 7/1949 | Arsem | 260—583 |
| 2,808,391 | 10/1957 | Pattison | 260—77.5 |
| 2,846,416 | 8/1958 | Arnold et al. | 260—77.5 |
| 2,870,157 | 1/1959 | Csendes | 260—299 |
| 3,015,636 | 1/1962 | Elmer | 260—18 |
| 3,070,571 | 12/1962 | Naylor | 260—41.5 |

FOREIGN PATENTS

| 634,215 | 1/1962 | Canada. |
| 655,550 | 1/1963 | Canada. |
| 931,747 | 7/1963 | Great Britain. |

OTHER REFERENCES

Japanese patent publication No. 35–14,781 (1960), 2 pages spec, no pages dwg.

Japanese patent publication No. 35–14,782 (1960), 2 pages spec, no pages dwg.

Chemical Abstracts, volume 55, No. 15, July 24, 1961, p. 14957 relied upon (call No. QD 1.A51).

The Condensed Chemical Dictionary, fifth edition, second printing, p. 357 (1957), call No. QD 5.C5.

DONALD E. CZAJA, Primary Examiner.

M. J. WELSH, Assistant Examiner.

U.S. Cl. X.R.

260—75, 77.5, 37, 40, 45.9

Dedication

3,438,916. —*Arnold Rogers Davis,* Berkeley Heights, N.J. USE OF CHLORINATED MELAMINES IN CURING OF POLYURETHANES. Patent dated Apr. 15, 1969. Dedication filed Mar. 4, 1983, by the assignee, *American Cyanamid Co.*

Hereby dedicates the remaining term of said patent to the Public.
[*Official Gazette May 31, 1983.*]